(12) United States Patent
Matsuoka et al.

(10) Patent No.: US 8,643,664 B2
(45) Date of Patent: Feb. 4, 2014

(54) GAMUT CONVERTING DEVICE AND GAMUT CONVERTING METHOD

(75) Inventors: Yuki Matsuoka, Kanagawa (JP); Norihiko Kawada, Kanagawa (JP)

(73) Assignee: Sony Corporation, Tokyo (JP)

( * ) Notice: Subject to any disclaimer, the term of this patent is extended or adjusted under 35 U.S.C. 154(b) by 935 days.

(21) Appl. No.: 11/897,166

(22) Filed: Aug. 29, 2007

(65) Prior Publication Data
US 2008/0055333 A1    Mar. 6, 2008

(30) Foreign Application Priority Data
Aug. 31, 2006    (JP) ................ P2006-236046

(51) Int. Cl.
G09G 5/02    (2006.01)

(52) U.S. Cl.
USPC ........... 345/590; 345/589; 345/591; 345/601; 345/602; 382/166; 382/167

(58) Field of Classification Search
None
See application file for complete search history.

(56) References Cited

U.S. PATENT DOCUMENTS

| | | | |
|---|---|---|---|
| 5,933,253 A | 8/1999 | Ito et al. | |
| 6,301,383 B1 | 10/2001 | Ito et al. | |
| 6,437,792 B1 * | 8/2002 | Ito et al. | 345/600 |
| 6,897,876 B2 * | 5/2005 | Murdoch et al. | 345/589 |
| 7,031,541 B2 * | 4/2006 | Sakuyama | 382/251 |
| 7,710,432 B2 * | 5/2010 | Edge | 345/589 |

FOREIGN PATENT DOCUMENTS

| | | |
|---|---|---|
| EP | 1 771 012 | 4/2007 |
| JP | 7 236069 | 9/1995 |
| JP | 8 161468 | 6/1996 |
| JP | 9 98298 | 4/1997 |
| JP | 2002 116749 | 4/2002 |
| JP | 2002 116750 | 4/2002 |
| JP | 2002 152530 | 5/2002 |
| JP | 2003 132345 | 5/2003 |
| JP | 2003 163813 | 6/2003 |
| JP | 2003 209706 | 7/2003 |
| JP | 3635673 | 1/2005 |
| JP | 2006 33575 | 2/2006 |

* cited by examiner

*Primary Examiner* — Antonio A Caschera
(74) *Attorney, Agent, or Firm* — Frommer Lawrence & Haug LLP; William S. Frommer

(57) ABSTRACT

A gamut converting device that applies gamut conversion to image data includes a signal converting unit that performs, when a negative value is included in an image signal value forming the image data, processing for converting the image signal value forming the image data to eliminate the negative value from the image signal value and a gamut converting unit that applies the gamut conversion to the image data, the image signal value of which is converted by the signal converting unit.

8 Claims, 14 Drawing Sheets

FIG. 6

TB1 (NEGATIVE SIGNAL RGB TABLE)

| | R | G | B |
|---|---|---|---|
| m0 | -0.3 | -0.3 | -0.3 |
| m1 | -0.3 | -0.3 | -0.2 |
| ... | ... | ... | ... |
| m13 | -0.3 | -0.3 | 1 |
| m14 | -0.3 | -0.2 | -0.3 |
| ... | ... | ... | ... |
| m195 | -0.3 | 1 | 1 |
| m196 | -0.2 | -0.3 | -0.3 |
| ... | ... | ... | ... |
| m1411 | 1 | 1 | -0.2 |
| m1412 | 1 | 1 | -0.1 |

TB2 (POSITIVE SIGNAL RGB TABLE)

| | R | G | B |
|---|---|---|---|
| p0 | 0 | 0 | 0 |
| p1 | 0 | 0 | 0.01 |
| ... | ... | ... | ... |
| p100 | 0 | 0 | 1 |
| p101 | 0 | 0.01 | 0 |
| ... | ... | ... | ... |
| p10200 | 0 | 1 | 1 |
| p10201 | 0.01 | 0 | 0 |
| ... | ... | ... | ... |
| p1030299 | 1 | 1 | 0.99 |
| p1030300 | 1 | 1 | 1 |

FIG. 7

TB1 (NEGATIVE SIGNAL RGB TABLE)

| | R | G | B |
|---|---|---|---|
| m0 | -0.3 | -0.3 | -0.3 |
| m1 | -0.3 | -0.3 | -0.2 |
| ... | ... | ... | ... |
| m13 | -0.3 | -0.3 | 1 |
| m14 | -0.3 | -0.2 | -0.3 |
| ... | ... | ... | ... |
| m195 | -0.3 | 1 | 1 |
| m196 | -0.2 | -0.3 | -0.3 |
| ... | ... | ... | ... |
| m1411 | 1 | 1 | -0.2 |
| m1412 | 1 | 1 | -0.1 |

RGB TO Lab CONVERSION

TB3 (NEGATIVE SIGNAL L*a*b* TABLE)

| | L* | a* | b* |
|---|---|---|---|
| m0 | -270 | 0 | 0 |
| m1 | -263 | 39 | -135 |
| ... | ... | ... | ... |
| m13 | -176 | 504 | -472 |
| m14 | -207 | -156 | 102 |
| ... | ... | ... | ... |
| m195 | 88 | -103 | -21 |
| m196 | -251 | 117 | 34 |
| ... | ... | ... | ... |
| m1411 | 96 | -22 | 388 |
| m1412 | 96 | -20 | 240 |

FIG. 8

TB2 (POSITIVE SIGNAL RGB TABLE)

| | R | G | B |
|---|---|---|---|
| p0 | 0 | 0 | 0 |
| p1 | 0 | 0 | 0.01 |
| ... | ... | ... | ... |
| p100 | 0 | 0 | 1 |
| p101 | 0 | 0.01 | 0 |
| ..... | | | |
| p10200 | 0 | 1 | 1 |
| p10201 | 0.01 | 0 | 0 |
| ..... | | | |
| p1030299 | 1 | 1 | 0.99 |
| p1030300 | 1 | 1 | 1 |

↓ RGB TO Lab CONVERSION

TB4 (POSITIVE SIGNAL L*a*b* TABLE)

| | L* | a* | b* |
|---|---|---|---|
| p0 | 0 | 0 | 0 |
| p1 | 7 | 31 | -51 |
| ... | ... | ... | ... |
| p100 | 34 | 66 | -110 |
| p101 | 32 | -50 | 47 |
| ..... | | | |
| p10200 | 91 | -69 | -16 |
| p10201 | 16 | 47 | 28 |
| ..... | | | |
| p1030299 | 99 | -2 | 6 |
| p1030300 | 100 | 0 | 0 |

FIG. 9

TB4 (POSITIVE SIGNAL L*a*b* TABLE)

| | L* | a* | b* |
|---|---|---|---|
| p0 | 0 | 0 | 0 |
| p1 | 7 | 31 | -51 |
| ... | ... | ... | ... |
| p100 | 34 | 66 | -110 |
| p101 | 32 | -50 | 47 |
| ... | ... | ... | ... |
| p10200 | 91 | -69 | -16 |
| p10201 | 16 | 47 | 28 |
| ... | ... | ... | ... |
| p1030299 | 99 | -2 | 6 |
| p1030300 | 100 | 0 | 0 |

SELECT L*a*b* SET CLOSEST TO L*a*b* SET OF m0 AMONG L*a*b* SETS OF p0 TO p1030301

TB3 (NEGATIVE SIGNAL L*a*b* TABLE)

| | L* | a* | b* |
|---|---|---|---|
| m0 | -270 | 0 | 0 |
| m1 | -263 | 39 | -135 |
| ... | ... | ... | ... |
| m13 | -176 | 504 | -472 |
| m14 | -207 | -156 | 102 |
| ... | ... | ... | ... |
| m195 | 88 | -103 | -21 |
| m196 | -251 | 117 | 34 |
| ... | ... | ... | ... |
| m1411 | 96 | -22 | 388 |
| m1412 | 96 | -20 | 240 |

FIG. 10

TB5
(CONVERSION L*a*b* TABLE)

|  | L* | a* | b* |
|---|---|---|---|
| m0 | 0 | 0 | 0 |
| m1 | 23 | 26 | -28 |
| ⋮ | ⋮ | ⋮ | ⋮ |
| m13 | 60 | 5 | -107 |
| m14 | 10 | 3 | -28 |
| ⋮ | ⋮ | ⋮ | ⋮ |
| m195 | 91 | -40 | -90 |
| m196 | 2 | 12 | 3 |
| ⋮ | ⋮ | ⋮ | ⋮ |
| m1411 | 97 | -17 | 10 |
| m1412 | 100 | 0 | 0 |

FIG. 11

TB5 (CONVERSION L*a*b* TABLE)

| | L* | a* | b* |
|---|---|---|---|
| m0 | 0 | 0 | 0 |
| m1 | 23 | 26 | -28 |
| ... | ... | ... | ... |
| m13 | 60 | 5 | -107 |
| m14 | 10 | 3 | -28 |
| ... | ... | ... | ... |
| m195 | 91 | -40 | -90 |
| m196 | 2 | 12 | 3 |
| ... | ... | ... | ... |
| m1411 | 97 | -17 | 10 |
| m1412 | 100 | 0 | 0 |

Lab TO RGB CONVERSION

TB6 (CONVERSION R'G'B' TABLE)

| | R' | G' | B' |
|---|---|---|---|
| m0 | 0 | 0 | 0 |
| m1 | 0.22 | 0.19 | 0.28 |
| ... | ... | ... | ... |
| m13 | 0.1 | 0.05 | 0.99 |
| m14 | 0.3 | 0.2 | 0.21 |
| ... | ... | ... | ... |
| m195 | 0.02 | 0.95 | 0.97 |
| m196 | 0.4 | 0.23 | 0.21 |
| ... | ... | ... | ... |
| m1411 | 1 | 0.9 | 0.95 |
| m1412 | 1 | 0 | 0 |

FIG. 12

TB6 (CONVERSION R'G'B' TABLE)

| | R' | G' | B' |
|---|---|---|---|
| m0 | 0 | 0 | 0 |
| m1 | 0.22 | 0.19 | 0.28 |
| ... | ... | ... | ... |
| m13 | 0.1 | 0.05 | 0.99 |
| m14 | 0.3 | 0.2 | 0.21 |
| ... | ... | ... | ... |
| m195 | 0.02 | 0.95 | 0.97 |
| m196 | 0.4 | 0.23 | 0.21 |
| .... | .... | .... | .... |
| m1411 | 1 | 0.9 | 0.95 |
| m1412 | 1 | 0 | 0 |

CALCULATE 3×3 MATRIX COEFFICIENT USING LEAST SQUARE METHOD →

$$\begin{bmatrix} R' \\ G' \\ B' \end{bmatrix} \text{(TB6)} = \begin{bmatrix} a & b & c \\ d & e & f \\ g & h & i \end{bmatrix} \text{3×3 MATRIX COEFFICIENT} \begin{bmatrix} R \\ G \\ B \end{bmatrix} \text{(TB1)}$$

TB1 (NEGATIVE SIGNAL RGB TABLE)

| | R | G | B |
|---|---|---|---|
| m0 | -0.3 | -0.3 | -0.3 |
| m1 | -0.3 | -0.3 | -0.2 |
| ... | ... | ... | ... |
| m13 | -0.3 | -0.3 | 1 |
| m14 | -0.3 | -0.2 | -0.3 |
| ... | ... | ... | ... |
| m195 | -0.3 | 1 | 1 |
| m196 | -0.2 | -0.3 | -0.3 |
| .... | .... | .... | .... |
| m1411 | 1 | 1 | -0.2 |
| m1412 | 1 | 1 | -0.1 |

GAMUT CONVERTING DEVICE AND GAMUT CONVERTING METHOD

CROSS REFERENCES TO RELATED APPLICATIONS

The present invention contains subject matter related to Japanese Patent Application JP 2006-236046 filed in the Japanese Patent Office on Aug. 31, 2006, the entire contents of which being incorporated herein by reference.

BACKGROUND OF THE INVENTION

1. Field of the Invention

The present invention relates to a gamut converting device and a gamut converting method that can be used in a so-called color management system for realizing appropriate color reproduction between different kinds of devices or different kinds of media.

2. Description of the Related Art

As a patent document related to the present invention, there are JP-A-10-84487, JP-A-7-236069, JP-A-2006-33575, JP-A-2002-152530, JP-A-9-98298, and Japanese Patent No. 3635673.

In order to realize color reproduction between different kinds of devices or different kinds of media, it is necessary to correct a difference in a color range, i.e., a gamut, between input and output devices. A technique for the correction is called gamut conversion or gamut compression. For example, as a display output device that performs image display, there are a CRT (Cathode Ray Tube), a projector, a liquid crystal panel, and the like. As the projector, there are various projectors such as projectors of so-called DLP system and SXRD system and a film projector. As the liquid crystal panel, there are various liquid crystal panels such as a liquid crystal panel of an LED (Light Emitting Diode) backlight system. These display output devices have different gamuts as gamuts reproducible by the display output devices.

For example, in FIG. 13, a difference among gamuts of devices A to E, which represent the various display output devices, is shown as an XYZ chromaticity diagram.

Since the reproducible gamuts are different depending on the devices, for example, in order to cause a certain display output device to display a certain image signal, it is necessary to correct the image signal to be suitable for a gamut corresponding to the display output device.

SUMMARY OF THE INVENTION

When conversion of a gamut (compression of a gamut) is performed, it is a general practice to convert a color space with reference to a three-dimensional lookup table.

For example, as shown in FIG. 14, a three dimensional lookup table of a square cube having R, G, and B as axes (in the following explanation, lookup table may be referred to as "LUT" and three-dimensional lookup table may be referred to as "3DLUT") is conceivable. In this 3DLUT, R, G, and B values inputted are divided into seventeen coefficient points (lattice points of a 3D skeleton) on the axes, respectively, to form a table of 17×17×17 conversion table coefficients. There are 4913 (17×17×17) lattice points marked by black circles. Output R, G, and B values or coefficient values for deriving the output R, G, and B values are stored in the respective lattice points. In other words, an output RGB value is calculated from an input RGB value with reference to a certain lattice point.

When each of the input R, G, and B values is 8 bit data, it is desirable that the number of coefficient points (lattice points) on each of the axes of the 3DLUT is originally set to 256 according to a quantization word length of the input values. In other words, it is desirable to establish a 256×256×256 3DLUT. However, in that case, since 256×256×256=16777216, the 3DLUT has an enormous size including about 16770 thousand data for each of R, G, and B.

Such a quantity of conversion table coefficients causes problems in implementation and cost of hardware. Moreover, it is difficult to handle the enormous quantity of conversion table coefficients. This imposes heavy loads on systems and operators in terms of, for example, a method of delivery of coefficient data and a processing time. Under such circumstances, it is a general practice to curtail the coefficients on each of the axes to about 17×17×17 and interpolate the coefficients to calculate conversion coefficients.

In such a 3DLUT, in many cases, the lattice points are allocated to values from 0.0 to 1.0. As the R value, the G value, and the B value inputted, values from 0.0 to 1.0 are assumed. In other words, in the 3DLUT, usually, it is not assumed that a negative signal value is inputted.

In this case, if a negative signal is inputted, a signal value of the signal is clipped to 0. As a result, a hue is changed and gradation is deteriorated.

For example, when an input RGB signal having an R value, a G value, and a B value of −0.1, 0.5, and 0.5 and an input RGB signal having an R value, a G value, and a B value of −0.2, 0.5, and 0.5 are assumed, these input RGB signals are inputted to the 3DLUT as the same signal (0.0, 0.5, 0.5). Therefore, the two colors originally different from each other change to the same color and gradation is lost. Moreover, hues of the colors also change.

In order to prevent such a problem, the lattice points of the 3DLUT only have to be increased such that the 3DLUT has negative values. However, this leads to an increase in a memory capacity necessary for the 3DLUT. For example, the 17×17×17 3DLUT is generated for the purpose of a reduction in a necessary memory capacity. Thus, it is not preferable to, for example, add α lattice points as values in a negative direction to increase the lattice points to (17+α)×(17+α)×(17+α).

If the lattice points are not increased (the memory capacity is not increased), there is also a method of allocating a part of the present lattice points to negative values. For example, β lattice points among the seventeen lattice points are allocated to negative values and (17−β) lattice points are allocated to the values from 0.0 to 1.0. However, in this case, naturally, since an interval between the lattice points from the viewpoint of an input signal value (a difference between signal values allocated to lattice points adjacent to each other) increases, accuracy of conversion falls.

For example, when three lattice points are allocated to negative values in the 17×17×17 3DLUT, a lattice interval is the same as that of a 14×14×14 3DLUT that does not have negative values.

Therefore, it is desirable to realize a gamut converting device and a gamut converting method for performing gamut conversion with which negative values of inputted image signal values are not clipped to 0 and not causing an increase in a capacity of a 3DLUT and a fall in accuracy of conversion.

A gamut converting device according to an embodiment of the present invention is a gamut converting device that converts input image data in a first gamut into a second gamut to obtain output image data. The gamut converting device includes a negative-signal processing unit that performs, when a negative value is included in image signal values forming the input image data, processing for converting the image signal values forming the input image data to eliminate the negative value from the image signal values and a gamut converting unit that converts the input image data, the image signal values of which are converted by the negative-signal processing unit, into the second gamut to obtain output image data.

The negative-signal processing unit includes a negative-value judging unit that judges whether a negative value is present as an image signal value forming the input image data and a negative-value converting unit that applies conversion processing to the input image data, in which it is judged by the negative-value judging unit that the image signal value of the negative value is present, to eliminate the negative value from in the image signal values forming the input image data.

The image signal values forming the input image data are first, second, and third color signal values.

The conversion processing performed by the negative-value converting unit is processing for performing an arithmetic operation using a 3×3 matrix coefficient set in advance and calculating first, second, third color signal values not including a negative value.

The gamut converting unit applies three-dimensional gamut conversion to the first, second, and third color signal values outputted from the negative-signal processing unit using a three-dimensional lookup table and obtains first, second, and third color signal values forming output image data.

A gamut converting method according to another embodiment of the present invention is a gamut converting method of converting input image data in a first gamut into a second gamut to obtain output image data. The gamut converting method includes a negative-signal processing step of performing, when a negative value is included in image signal values forming the input image data, processing for converting the image signal values forming the input image data to eliminate the negative value from in the image signal values and a gamut converting step of converting the input image data, the image signal values of which are converted in the negative-signal processing step, into the second gamut to obtain output image data.

According to the embodiments of the present invention, when a negative value is included in input image data, the conversion processing for eliminating the negative value from in the input image data is performed by the negative-signal processing unit (in the negative-signal processing step) at a stage before the input image data is converted into the second gamut. Conversion processing, which is not simple 0-clip, is executed using, for example, conversion coefficients of a 3×3 linear matrix. In other words, it is possible to represent a negative value as zero or a positive value before the negative value is inputted to the gamut converting unit that uses the 3DLUT.

Since the negative value is represented as zero or a positive value according to the conversion processing, which is not 0-clip, it is possible to cope with gamut conversion using a 3DLUT having lattice points of only 0 and positive values while minimizing a change in a hue and preventing a fall in gradation from being caused.

According to the embodiments of the present invention, when a negative value is included in image signal values forming input image data, the conversion processing for eliminating the negative value from the image signal value forming the input image data is performed. Input image data formed by zero or positive image signal values is inputted to the gamut converting unit. In this case, the conversion processing, which is not simple 0-clip, is executed using, for example, conversion coefficients of a 3×3 linear matrix to represent negative signal values as zero or positive signal values. This makes it possible to minimize a change in a hue and a fall in gradation and, then, perform appropriate gamut conversion using a 3DLUT having lattice points of only 0 and positive values.

In other words, it is possible to execute, even when negative signal values are inputted, high-definition gamut conversion without causing an increase in a size of the 3DLUT and a fall in conversion accuracy.

BRIEF DESCRIPTION OF THE DRAWINGS

FIG. 6 is a diagram for explaining a negative signal RGB table and a positive signal L*a*b* table according to the embodiment;

FIG. 7 is a diagram for explaining generation of a negative signal L*a*b* table according to the embodiment;

FIG. 8 is a diagram for explaining generation of a positive signal L*a*b* table according to the embodiment;

FIG. 9 is a diagram for explaining selection of a closest L*a*b* set according to the embodiment;

FIG. 10 is a diagram for explaining a converted L*a*b* table according to the embodiment;

FIG. 11 a diagram for explaining a converted R'G'B' table according to the embodiment;

FIG. 12 is a diagram for explaining 3×3 matrix coefficient calculation according to the embodiment;

DESCRIPTION OF THE PREFERRED EMBODIMENTS

A gamut converting device and a gamut converting method according to an embodiment of the present invention will be hereinafter explained.

Figure 1:
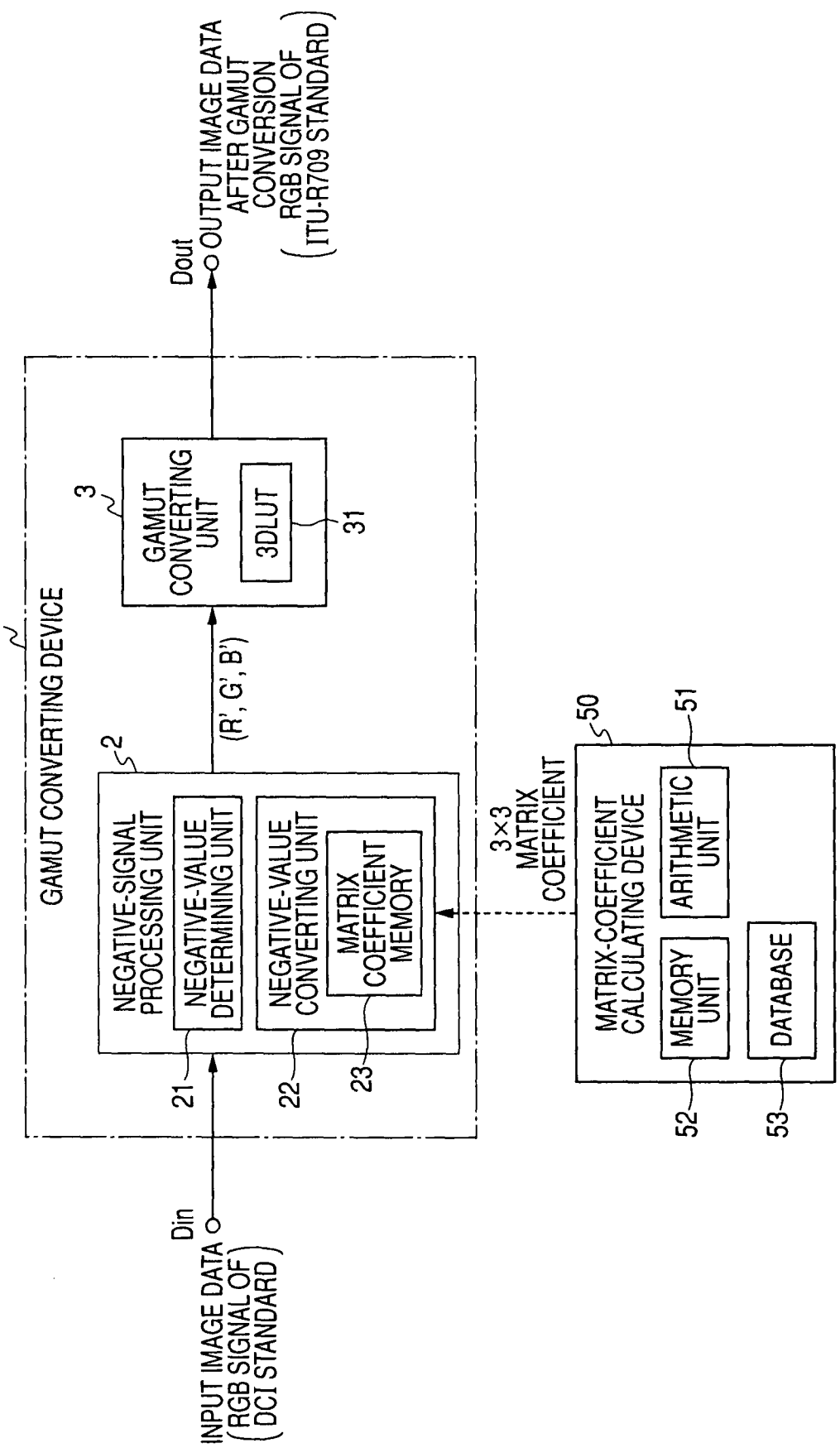
FIG. 1 is a block diagram of a gamut converting device and a matrix-coefficient calculating device according to an embodiment of the present invention.

FIG. 1 shows an example of a structure of a gamut converting device 1 and a matrix-coefficient calculating device 50 according to the embodiment.

The gamut converting device 1 is a device that converts input image data Din in a first gamut into output image data Dout in a second gamut. In this example, an RGB signal of the DCI (Digital Cinema Initiatives) standard is the input image data Din. The gamut converting device 1 subjects the image data of the DCI standard to gamut conversion using a 3DLUT in order to display the image data on a display device having a gamut of the ITU-R (International Telecommunication Union Radio communication sector) 709 standard. Output image data Dout is image data in the gamut of the ITU-R709 standard.

In the following explanation, simply as an example, the first gamut is set as the gamut of the DCI standard and the second gamut is set as the gamut of the ITU-R709 standard. Various examples of a gamut of the input image data Din inputted to the gamut converting device 1 and a gamut of the output image data Dout outputted from the gamut converting device 1 are conceivable. It goes without saying that gamut conversion corresponding to input and output gamuts only has to be performed in the gamut converting device 1.

The gamut converting device 1 has a negative-signal processing unit 2 and a gamut converting unit 3.

An RGB signal of the DCI standard is inputted to the negative-signal processing unit 2 as the input image data Din. A negative-value judging unit 21 and a negative-value converting unit 22 are provided in the negative-signal processing unit 2.

The negative-value judging unit 21 judges whether there is a negative value in image signal values of an R value, a G value, and a B value in the RGB signal inputted.

The negative-value converting unit 22 performs conversion processing by an arithmetic operation employing a 3×3 matrix coefficient stored in a matrix coefficient memory 23. The negative-value converting unit 22 converts, when at least one negative value is present among an R value, a G value, and a B value inputted, the R value, the G value, and the B value into an R' value, a G' value, and a B' value according to the arithmetic operation employing the 3×3 matrix coefficient.

Arithmetic processing by the negative-value converting unit 22 is represented by the following Formula 1.

$$\begin{bmatrix} R' \\ G' \\ B' \end{bmatrix} = \begin{bmatrix} a & b & c \\ d & e & f \\ g & h & i \end{bmatrix} \begin{bmatrix} R \\ G \\ B \end{bmatrix}$$

A matrix coefficient as "a", "b", "c", "d", "e", "f", "g", "h", and "i" is stored in the matrix coefficient memory 23.

The 3×3 matrix coefficient is calculated by an external matrix-coefficient calculating device 50 in advance and stored in the matrix coefficient memory 23 of the gamut converting device 1. A structure of the matrix-coefficient calculating device 50 and a matrix-coefficient calculating method will be described later.

As described above, when there is at least one negative value among an R value, a G value, and a B value in an RGB value inputted, the negative-signal processing unit 2 converts the R value, the G value, and the B value into the R' value, the G' value, and the B' value according to Formula 1 and outputs the R' value, the G' value, and the B' value to the gamut converting unit 3.

When all of an R value, a G value, and a B value in an RGB signal inputted are 0 or positive values, the negative-signal processing unit 2 directly outputs the R value, the G value, and the B value to the gamut converting unit 3 as an R' value, a G' value, and a B' value.

The gamut converting unit 3 includes a 3DLUT 31 and applies gamut conversion to the R' value, the G' value, and the B' value supplied using the 3DLUT.

Figure 14:
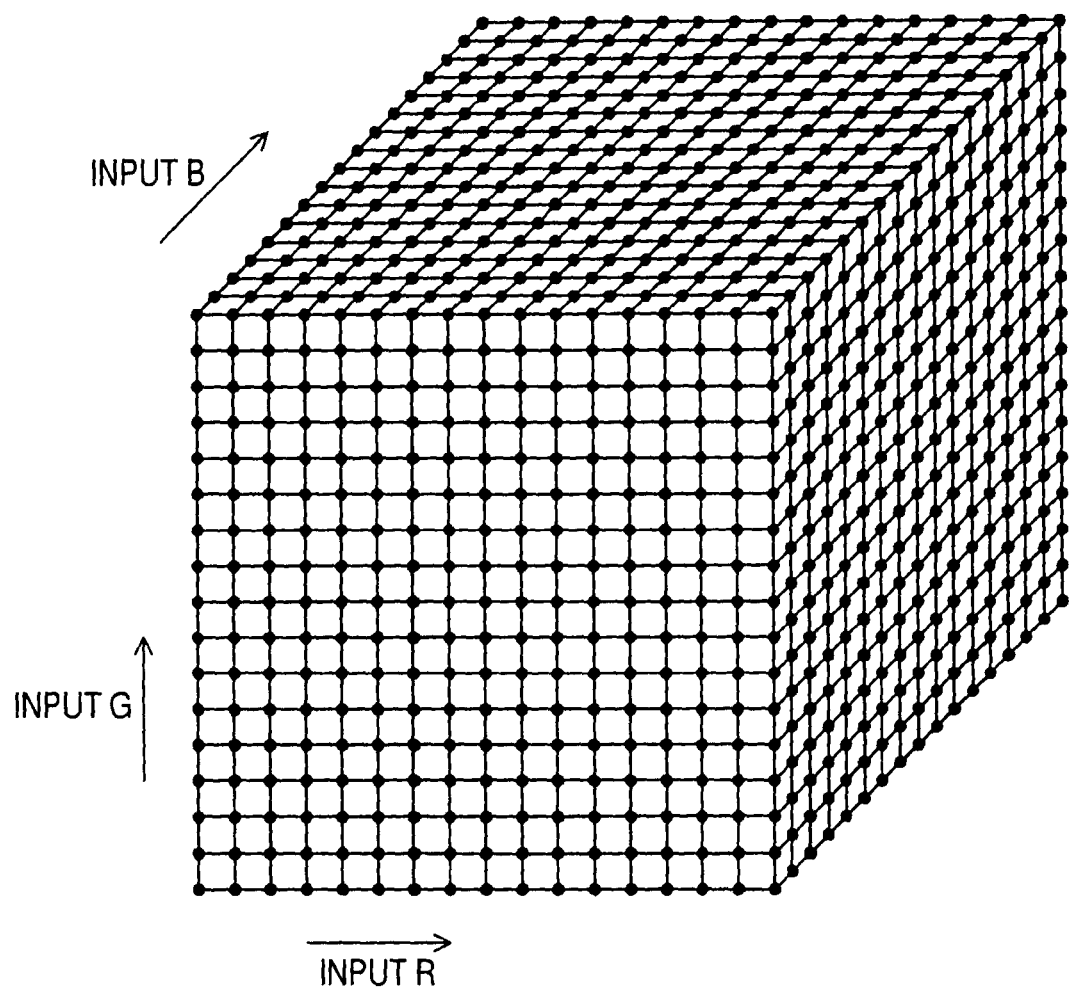
FIG. 14 is a diagram for explaining a 3DLUT.

For example, the gamut converting unit 3 has the 3DLUT 31 as a 17×17×17 conversion table including seventeen lattice points (coefficient points) on each of an R axis, a G axis, and a B axis as shown in FIG. 14. In the 3DLUT 31, there are 4913 (17×17×17) lattice points marked by black circles and output R, G, and B values or coefficient values for deriving the output R, G, and B values are stored in the respective lattice points.

The gamut converting unit 3 obtains an output RGB value subjected to the gamut conversion and outputs the output RGB value as output image data Dout after the gamut conversion by referring to the incoming R' value, G' value, and the Be value for a certain lattice point in the 3DLUT 31.

In the case of this example, the 3DLUT 31 is a 3DLUT for converting an RGB signal in the gamut of the DCI standard into an RGB signal in the gamut of the ITU-R709 standard.

In the 3DLUT 31, the seventeen lattice points are associated in a range of, for example, 0.0 to 1.0 as R values, G values, and B values inputted. In other words, the 3DLUT 31 is a conversion table formed by assuming only input of 0 and positive values.

The gamut converting device 1 shown in FIG. 1 may be built in a video display device or may be connected to the video display device as an external device.

Figure 2A:
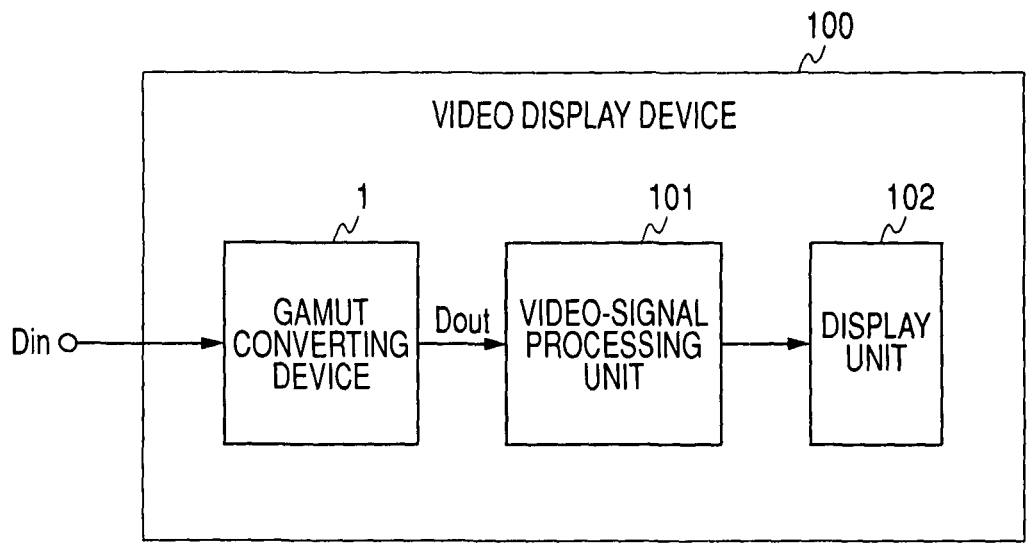
FIGS. 2A and 2B are diagrams for explaining a relation between the gamut converting device according to the embodiment and a video display device.

FIG. 2A shows an example in which the gamut converting device 1 is built in a video display device 100. In this case, first, input image data Din inputted to the video display device 100 is converted into output image data Dout subjected to the gamut conversion in the gamut converting device 1. This output image data Dout is subjected to necessary processing by a video-signal processing unit 101 and displayed on a display unit 102.

For example, it is assumed that the display unit 102 is a display (e.g., a CRT) having the gamut of the ITU-R709 standard. Then, for example, input image data Din as an RGB signal of the DCI standard is converted into an RGB signal in the gamut of the ITU-R709 standard by the gamut converting device 1, processed by the video-signal processing unit 101, and displayed on the display unit 102. Consequently, display matching a gamut of the display unit 102 is realized.

Figure 2B:
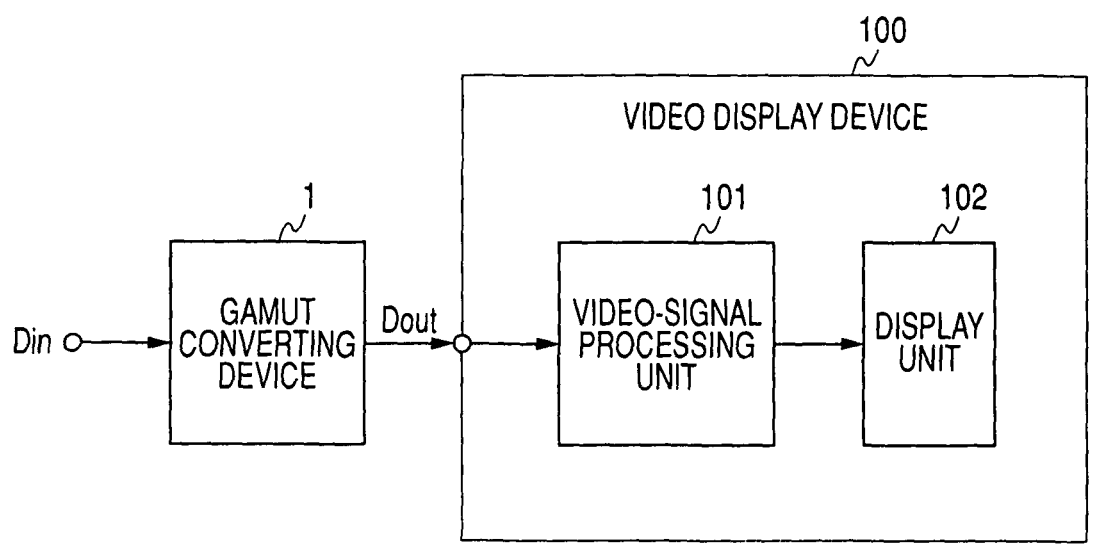

FIG. 2B shows an example in which the gamut converting device 1 is provided as an external device of the video display device 100. For example, it is assumed that the display unit 102 of the video display device 100 is a display having the gamut of the ITU-R709 standard as opposed to input image data Din as an RGB signal of the DCI standard. Then, the gamut converting device 1 is connected in this way and output image data Dout converted into an RGB signal in the gamut of the ITU-R709 standard by the gamut converting device 1 is supplied to the video display device 100. Consequently, display matching the gamut of the display unit 102 is realized.

Figure 3:
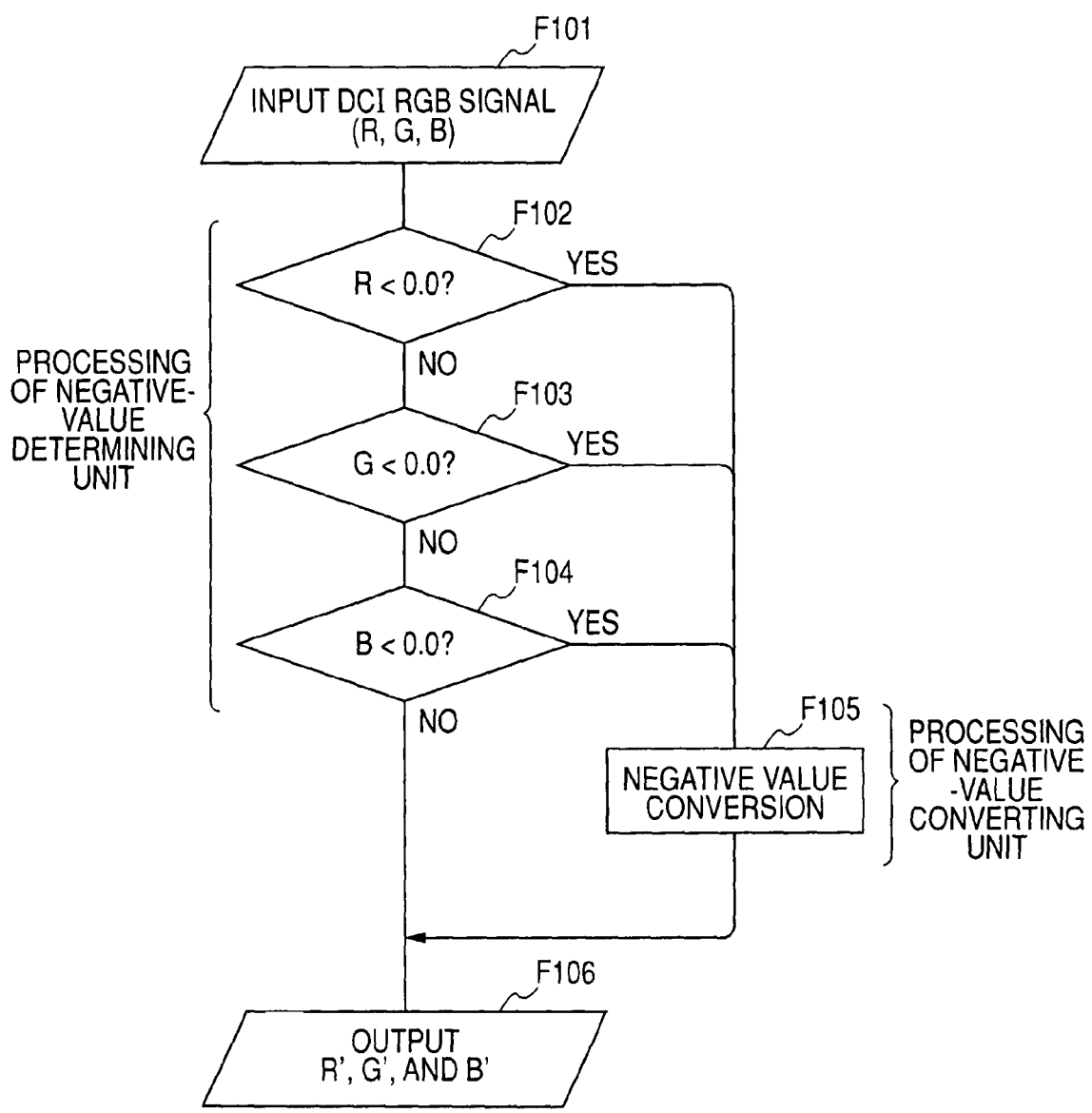
FIG. 3 is a flowchart of processing by a negative-signal processing unit according to the embodiment.

Processing performed by the negative-signal processing unit 2 of the gamut converting device 1 is shown in a flowchart in FIG. 3.

When an RGB signal in the gamut of the DCI standard is inputted as input image data Din in step F101, in the negative-signal processing unit 2, first, the negative-value judging unit 21 applies judgment in steps F102, F103, and F104 to an R value, a G value, and a B value inputted. In other words, the negative-value judging unit 21 judges whether each of the R value, the G value, and the B value is a negative value.

When at least one of the R value, the G value, and the B value is a negative value, the negative-signal processing unit 2 proceeds to step F105 and performs negative value conversion. In this case, the negative-signal processing unit 2 performs the arithmetic operation of Formula 1 employing the 3×3 matrix coefficient in the negative-value converting unit 22 to convert the R value, the G value, and the B value into a state in which all of the R value, the G value, and the B value are not negative values. In step F106, the negative-signal processing unit 2 outputs, as a conversion result, an R' value, a G' value, and a B' value not including a negative value to the gamut converting unit 3.

When all of the R value, the G value, and the B value inputted in step F101 are 0 or positive values and there is no negative value, after the judgment in steps F102, F103, and F104, the negative-signal processing unit 2 proceeds to step F106. In this case, the R value, the G value, and the B value inputted are directly outputted to the gamut converting unit 3 as an R' value, a G' value, and a B' value.

Since such processing is applied to the RGB signal inputted as the input image data Din in the negative-value converting unit 22, a negative value is not supplied to the gamut converting unit 3 as an RGB signal value.

Therefore, in the 3DLUT 31 in which a negative value is not assumed as an input value, i.e., the 3DLUT in which lattice points are set in association with values of, for example, 0.0 to 1.0, no negative value is clipped to 0. Therefore, a change in a hue and a fall in gradation due to clip do not occur in gamut conversion. In particular, when a negative signal value is converted into 0 or a positive signal value by an appropriate 3×3 matrix coefficient, it is possible to keep gradation and display more faithful colors.

Since negative value input does not have to be assumed in the 3DLUT 31, it is unnecessary to increase lattice points in the 3DLUT 31 in order to cope with the negative value input, i.e., it is unnecessary to increase a size of the 3DLUT 31. Moreover, accuracy of conversion is not deteriorated by allocating a part of the lattice points to negative values.

The negative-signal processing unit 2 performs, when a negative value is included in an RGB value, the conversion processing for eliminating the negative value from signal values of the RGB signal using the 3×3 matrix coefficient. In order to make it possible to keep a hue and gradation according to the conversion, the 3×3 matrix coefficient has to be set appropriately.

The 3×3 matrix coefficient is set in advance and stored in the matrix coefficient memory 23.

In FIG. 1, the matrix-coefficient calculating device 50 that calculates the 3×3 matrix coefficient stored in the matrix coefficient memory 23 of the gamut converting device 1 is shown. The matrix-coefficient calculating device 50 can be realized by a device that has functions of an arithmetic unit 51, a memory unit 52, and a database 53.

The arithmetic unit 51 performs various kinds of arithmetic processing for calculation of a matrix coefficient described later such as processing for conversion between an RGB signal and an L*a*b* signal, a $\Delta E^*$ arithmetic operation, a $\Delta E^*94$ arithmetic operation, and a table format operation.

The memory unit 52 has memory areas such as a ROM area, a RAM area, and a nonvolatile memory area. A program, processing coefficients, and the like for the arithmetic processing in the arithmetic unit 51 are stored in the ROM area. The program is a program for calculation of a matrix coefficient described later. The RAM area in the memory unit 52 is used as a work area for the arithmetic processing and a storage area of a table data described later.

The database 53 stores coefficients and the like for conversion between an RGB signal and an L*a*b* signal.

Such a matrix-coefficient calculating device 50 can be realized by installing a program for executing the matrix coefficient calculation processing described later in various information processing devices such as a general-purpose computer device.

The matrix-coefficient calculating device 50 may be provided as a device unit built in the gamut converting device 1.

The calculation of a 3×3 matrix coefficient executed by the matrix-coefficient calculating device 50 will be hereinafter explained.

First, before explaining a method of calculating a 3×3 matrix coefficient, conversion processing performed by using the 3×3 matrix coefficient, i.e., conversion processing performed in the negative-value converting unit 22 will be briefly explained with reference to FIG. 4.

Figure 4:
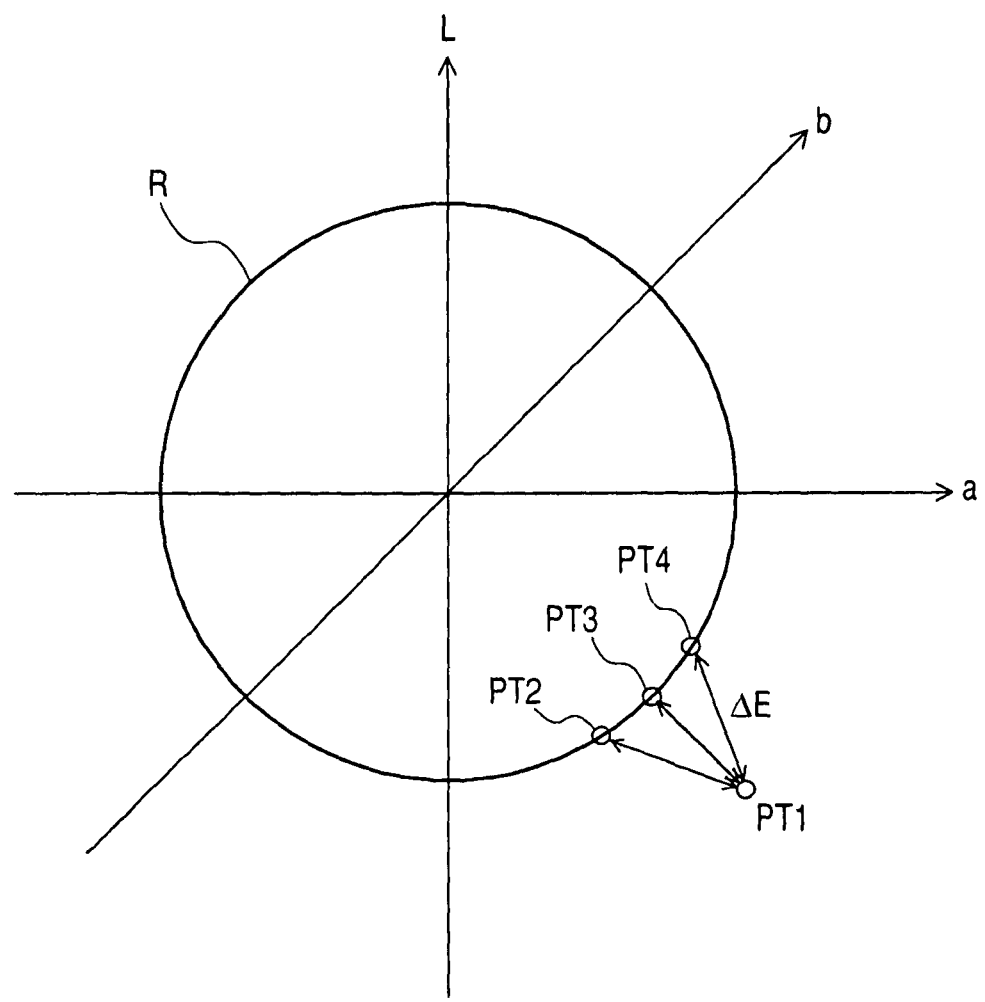
FIG. 4 is a diagram for explaining processing for converting a negative signal according to the embodiment.

In FIG. 4, a three-dimensional space having an L* axis, an a* axis, and a b* axis is shown as an L*a*b* calorimetric system space. A sphere R in this three-dimensional space indicates a range in which all of an R value, a G value, and a B value as an RGB signal are equal to or larger than 0 (0 or positive values). In other words, when there is at least one negative value among the R value, the G value, and the B value as the RGB signal, the negative value is a point outside the sphere R in the L*a*b* calorimetric system space.

For example, a point PT1 is a point on the L*a*b* calorimetric system space of an RGB signal value in which at least one of an R value, a G value, and a B value is a negative value.

The L*a*b* calorimetric system is a device-independent calorimetric system-set by the CIE (Commission Internationale de l'Eclairage). L* is brightness and all hues are represented by combinations of a* and b*. An a* value is chroma of red to green and a b* value is chroma of yellow to blue.

The conversion processing executed in the negative-value converting unit 22 of the gamut converting device 1 in this example is processing for converting, for example, an RGB signal at the point PT1 in the L*a*b* calorimetric system into an RGB signal in the sphere R (within the surface of the sphere R).

There are various ideas concerning an RGB signal value at a point among innumerable points in the sphere R into which the RGB signal value at the point PT1 should be converted. As one of ideas for minimizing a hue change and a fall in gradation, a method of converting, using a color difference formula represented by $\Delta E^*$ or $\Delta E^*94$ described later, the RGB signal value into a point where the hue change and the fall in gradation are minimized, i.e., a point of a color having a smallest color difference.

For example, it is assumed that, as a color at a conversion destination of the point PT1, there are candidate points PT2, PT3, and PT4 in the sphere R as shown in the figure. These points PT2, PT3, and PT4 are points where all of an R value, a G value, and a B value are 0 or positive values.

In this case, $\Delta E^*$ between the candidate points and the point PT1 is calculated and the point PT1 is converted into the candidate point having smallest $\Delta E^*$. For example, when $\Delta E^*$ between the points PT1 and PT2 is the smallest, the point PT2 is set as a conversion destination.

The 3×3 matrix coefficient explained below is a coefficient for deriving a conversion destination where $\Delta E$ is the smallest in this way.

Figure 5:
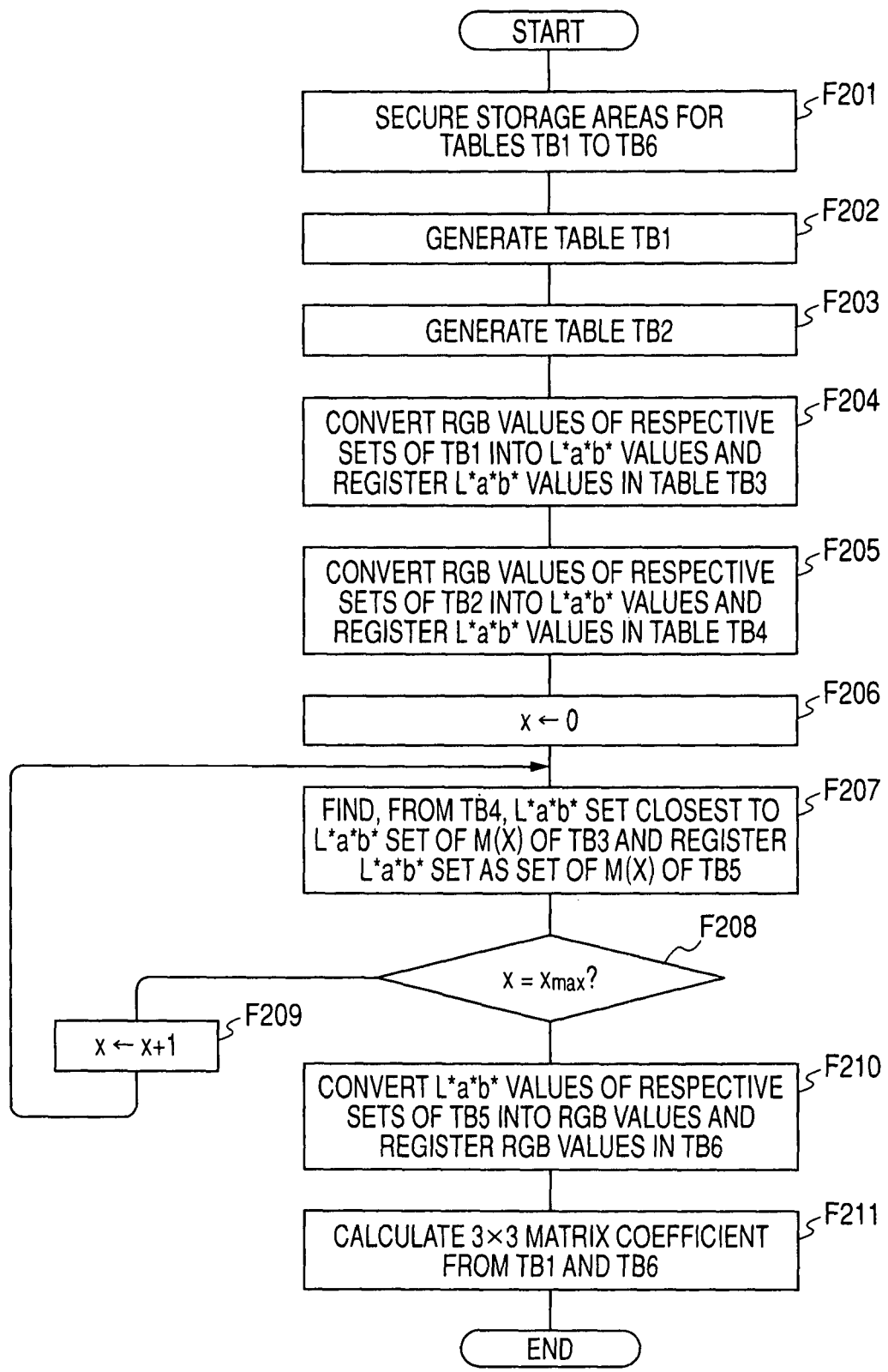
FIG. 5 is a flow chart of 3×3 matrix coefficient calculation processing according to the embodiment.
Figure 13:
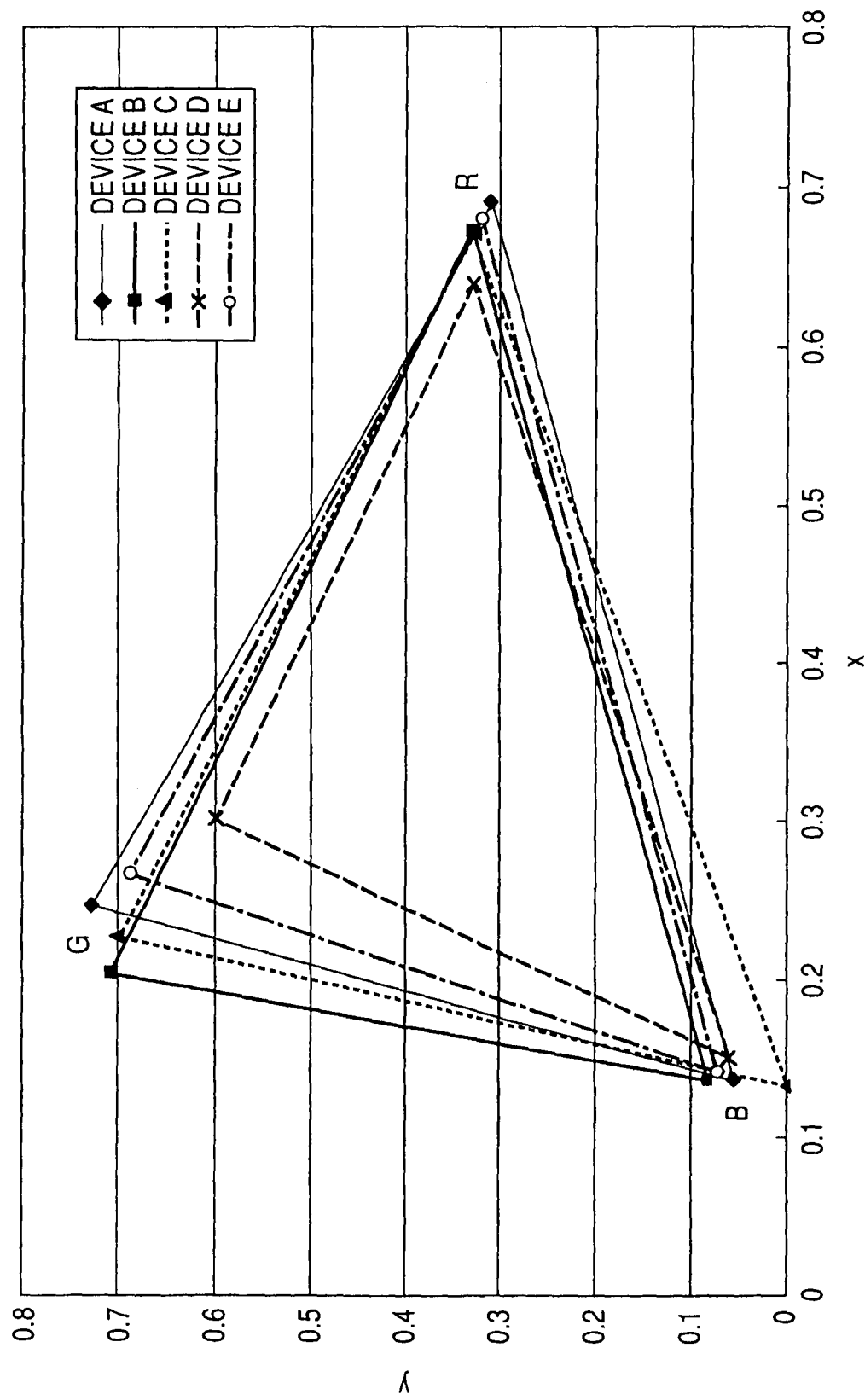
FIG. 13 is a diagram for explaining gamuts of various kinds of display devices.

Processing by the matrix-coefficient calculating device 50 for calculating such a 3×3 matrix coefficient is shown in FIG. 5. FIG. 5 shows processing that the arithmetic unit 51 in the matrix-coefficient calculating device 50 executes using the memory unit 52 and the database 53.

First, in step F201, the arithmetic unit 51 secures a storage area for tables TB1 to TB6 in the memory unit 52.

The tables TB1 to TB6 are, as explained below, a negative signal RGB table TB1, a positive signal RGB table TB2, a negative signal L*a*b* table TB3, a positive signal L*a*b* table TB4, a converted L*a*b* table TB5, and a converted R'G'B' table TB6.

In step F202, the arithmetic unit 51 generates the negative signal RGB table TB1. In step F203, the arithmetic unit 51 generates the positive signal RGB table TB2.

Examples of the negative signal RGB table TB1 and the positive signal RGB table TB2 are shown in FIG. 6.

First, values at fourteen stages including negative values are assumed for each of an R value, a G value, and a B value. For example, the values are "−0.3", "−0.2", "−0.1", "0.0", "0.1", "0.2", . . . , "0.9", and "1.0".

When, for example, the values at the fourteen stages are assumed at intervals of 0.1 in this way, a total number of combinations of the R value, the G value, and the B value is 2744, which is the third power of 14.

Among the 2744 combinations, combinations in which all of the R value, the G value, and the B value are 0 or positive values are combinations of values at eleven stages, i.e., "0.0", "0.1", ..., "0.9", and "1.0". Thus, the number of combinations is 1331, which is the third power of 11.

The number of combinations in which at least one of the R value, the G value, and the B value is a negative value is 2744−1331=1413.

In step F202, the arithmetic unit 51 registers the 1413 combinations of the R value, the G value, and the B value as the negative signal RGB table TB1.

In FIG. 6, the 1413 combinations with combination numbers m0 to m1412 are shown. As each of the combinations, a combination of the R value, the G value, and the B value including at least one negative value is registered. For example, an m0 set is a set in which the R value, the G value, and the B value are "−0.3", "−0.3", and "−0.3", respectively. An m1 set is a set in which the R value, the G value, and the B value are "−0.3", "−0.3", and "−0.2", respectively. An m1412 set is a set in which the R value, the G value, and the B value are "1", "1", and "−0.1", respectively.

In the positive signal RGB table TB2 generated in step F203, combinations in which all of the R value, the G value, and the B value are positive signal values are registered.

In FIG. 6, for example, the positive signal RGB table TB2 in which all combinations the R value, the G value, and the B value obtained by dividing values "0.0" to "1.0" into 101 stages at the intervals of 0.01 is shown.

For example, the total number of all the combinations is 1030301, which is the third power of 101. In FIG. 6, these combinations are indicated by combination numbers p0 to p1030300.

For example, a p0 set is a set in which the R value, the G value, and the B value are "0", "0", and "0", respectively. A p1 set is a set in which the R value, the G value, and the B value are "0", "0", and "0.01", respectively. A m1030300 set is a set in which the R value, the G value, and the B value are "1", "1", and "1", respectively.

Subsequently, in step F204, the arithmetic unit 51 converts the RGB values of the respective sets of the negative signal RGB table TB1 into L*a*b* values and registers the L*a*b* values in the negative signal L*a*b* table TB3.

A state of this conversion of the RGB values and registration of the L*a*b* values in the negative signal L*a*b* table TB3 is shown in FIG. 7. In the negative signal L*a*b* table TB3, the values of the respective sets m0 to m1412 of the negative signal RGB table TB1 are registered in an L* value, an a* value, and a b* value.

For example, "−0.3", "−0.3", and "−0.3", which are the R value, the G value, and the B value of the m0 set, are converted into an L*a*b* value and registered in the L* value, the a* value, and the b* value of the m0 set of the negative signal L*a*b* table TB3 as "−270", "0", and "0".

The R value, the G value, and the B value in the m1 set and the subsequent sets are also converted into the L* value, the a* value, and the b* value and registered in the m1 set and the subsequent sets of the negative signal L*a*b* table TB3.

The L* value, the a* value, and the b* value are obtained from the values of R, G, and B according to the following Formula 2.

$$\begin{bmatrix} X \\ Y \\ Z \end{bmatrix} = \begin{bmatrix} a' & b' & c' \\ d' & e' & f' \\ g' & h' & i' \end{bmatrix} \begin{bmatrix} R \\ G \\ B \end{bmatrix}$$

$$L^* = 116(Y/Yn)^{1/3} - 16$$

$$a^* = 500\{(X/Xn)^{1/3} - (Y/Yn)^{1/3}\}$$

$$b^* = 200\{(Y/Yn)^{1/3} - (Z/Zn)^{1/3}\}$$

Here, Xn, Yn, and Zn are tristimulus values of a light source. For example, in the case of a standard illuminant $D_{65}$, (Xn, Yn, Zn)=(95.04, 100.00, 108.89).

In step F205, as in step F204, the arithmetic unit 51 converts the RGB values of the respective sets of the positive signal RGB table TB2 into L*a*b* values and registers the L*a*b* values in the positive signal L*a*b* table TB4.

A state of this conversion of the RGB values and registration of the L*a*b* values in the positive signal L*a*b* table TB4 is shown in FIG. 8. In the positive signal L*a*b* table TB4, the values of the respective sets p0 to p1030300 of the positive signal RGB table TB2 are registered as an L* value, an a* value, and a b* value.

For example, "0", "0", and "0", which are the R value, the G value, and the B value of the p0 set, are converted into an L*a*b* value and registered as the L* value, the a* value, and the b* value ("0", "0", and "0") of the m0 set of the positive signal L*a*b* table TB4.

"0", "0", and "0.01", which are the R value, the G value, and the B value of the p1 set, are converted into an L*a*b* value and registered as the L* value, the a* value, and the b* value ("7", "31", and "−51") of the m1 set of the positive signal L*a*b* table TB4. The same processing is applied to the m2 set and the subsequent sets.

After generating the negative signal L*a*b* table TB3 and the positive signal L*a*b* table TB4 as described above, the arithmetic unit 51 generates the converted L*a*b* table TB5 in processing in steps F206, F207, F208, and F209.

In step F206, the arithmetic unit 51 sets a variable "x" to 0. In step F207, the arithmetic unit 51 finds a set of the L* value, the a* value, and the b* value closest to the L* value, the a* value, and the b* value of an m(x) set of the negative signal L*a*b* table TB3 from the positive signal L*a*b* table TB4. The arithmetic unit 51 registers the set of the L* value, the a* value, and the b* value found as the L* value, the a* value, and the b* value of the m(x) set of the converted L*a*b* table TB5.

Therefore, first, at the point in time of x=0, as shown in FIG. 9, the arithmetic unit 51 selects a set of the L*a*b* value closest to the L*a*b* value of the m0 set in the negative signal L*a*b* table TB3 from the p0 set to p1030300 set in the positive signal L*a*b* table TB4.

The L*a*b* values of the respective sets registered in the negative signal L*a*b* table TB3 are the L*a*b* values on the outside of the sphere R in FIG. 4. The L*a*b* values of the respective sets registered in the positive signal L*a*b* table TB4 are the L*a*b* values on the inside of the sphere R.

Therefore, the processing in step F207 is equivalent to processing for finding, for example, a point P3, which is the L*a*b* value closest to the L*a*b* value at the point P1 shown in FIG. 4.

This processing is repeated while incrementing the variable "x" gin step F209 until the variable "x" reaches xmax in step F208. xmax is a total number of combinations in the negative signal L*a*b* table TB3. In the case of this example, xmax is 1412.

In other words, sets of the L*a*b* values closest to the L*a*b* values of the respective sets of the negative signal L*a*b* table TB3 are found from the positive signal L*a*b* table TB4 and registered in an m0 set to an m1412 set of the converted L*a*b* table TB5 in FIG. 10.

As the sets of the L*a*b* values closest to the L*a*b* values of the respective sets of the negative signal L*a*b* table TB3, the L*a*b* value in which a value of the color difference formula of ΔE* or ΔE*94, which is the color difference formula defined by the CIE, is minimized only has to be selected. The color difference formulae of ΔE* and ΔE*94 are shown in Formula 3 and Formula 4 below.

$$\Delta E^* = \sqrt{(\Delta L^*)^2 + (\Delta a^*)^2 + (\Delta b^*)^2}$$

$$\Delta E_{94}^* = \sqrt{\left(\frac{\Delta L^*}{k_L \cdot S_L}\right)^2 + \left(\frac{\Delta C_{ab}^*}{k_C \cdot S_C}\right)^2 + \left(\frac{\Delta H_{ab}^*}{k_H \cdot S_H}\right)^2}$$

$$S_L = 1$$

$$S_C = 1 + 0.045 \times \sqrt{C_{ab,1}^* \cdot C_{ab,2}^*}$$

$$S_H = 1 + 0.015 \times \sqrt{C_{ab,1}^* \cdot C_{ab,2}^*}$$

In these formulae, ΔL* is a difference of the L* value, Δa* is a difference of the a* value, and Δb* is a difference of b* value. C* and H* are values of a so-called L*C*H colorimetric system. C* is a chroma and H* is a hue.

C* and H* are calculated as follows.

$$C^* = \sqrt{a^{*2} + b^{*2}}$$

$$H^* = \arctan(b^*/a^*)$$

When, for example, ΔE* of Formula 3 is used, concerning the m0 set of the negative signal L*a*b* table TB3, ΔE* is calculated between the L* value, the a* value, and the b* value of this m0 set and all the sets of the positive signal L*a*b* table TB4.

The arithmetic unit 51 calculates ΔE* between the L*a*b* value of the m0 set and the L*a*b* value of the p0 set, ΔE* between the L*a*b* value of the m0 set and the L*a*b* value of the p1 set, and ΔE* between the L*a*b* value of the m0 set and the L*a*b* value of the p1030300 set. As a result, the arithmetic unit 51 selects a set having minimum ΔE* with respect to the m0 set among the p0 set to the p1030300 set and registers the L*a*b* value of the p set selected in the m0 set of the converted L*a*b* table TB5.

In step F206, F207, F208, and F209, the arithmetic unit 51 applies such processing to the m0 set to the m1412 set. Consequently, the L*a*b* values as the points on the inside of the sphere R shown in FIG. 4 are registered in the m0 set to the m1412 set of the converted L*a*b* table TB5 in FIG. 10, respectively.

Subsequently, in step F210, the arithmetic unit 51 converts the L*a*b* values of the m0 set to the m1412 set of the converted L*a*b* table TB5 into RGB values and registers the RGB values in an m0 set to an m1412 set of the converted R'G'B' table TB6.

A state of this conversion of the L*a*b* values and registration of the RGB values in the converted R'G'B' table TB6 is shown in FIG. 11. For example, the L* value, the a* value, and b* value of the m0 set are converted into an RGB value and registered as an R' value, a G' value, and a B' value of the m0 set of the converted R'G'B' table TB6. The same processing is applied to the m1 set and the subsequent sets. Since all the L*a*b* values registered in the converted L*a*b* table TB5 are points in the sphere R in FIG. 4, all values of the respective sets of the converted R'G'B' table TB6 obtained by converting the L*a*b* values into the RGB values are 0 or positive values.

Finally, in step F211, as shown in FIG. 12, the arithmetic unit 51 calculates a 3×3 matrix coefficient from the negative signal RGB table TB1 and the converted R'G'B' table TB6 using the method of least square as follows.

$$\begin{bmatrix} R' \\ G' \\ B' \end{bmatrix} = \begin{bmatrix} a & b & c \\ d & e & f \\ g & h & i \end{bmatrix} \begin{bmatrix} R \\ G \\ B \end{bmatrix}$$

The arithmetic unit 51 calculates "a", "b", "c", "d", "e", "f", "g", "h", and "i", which are conversion coefficients for the RGB values of the negative signal RGB table TB1 and the R'G'B' values of the converted R'G'B' tables TB6.

According to the processing described above, the 3×3 matrix coefficient is calculated.

Eventually, the 3×3 matrix coefficient calculated in this way is a conversion coefficient for deriving the point PT3 of the RGB value, in which ΔE* is the smallest and a negative value is not included, from, for example, the RGB value corresponding to the point PT1 in FIG. 4.

The 3×3 matrix coefficient is stored in the matrix coefficient memory 23 of the gamut converting device 1. The negative-value converting unit 22 converts an RGB value including a negative value into an RGB value not including a negative value using the 3×3 matrix coefficient. Consequently, it is possible to appropriately perform gamut conversion using the 3DLUT 31 in which negative value input is not assumed. It is also possible to minimize a hue change in the gamut conversion and maintain gradation.

In other words, it is possible to execute, even when negative signal values are inputted, high-definition gamut conversion without causing an increase in a size of the 3DLUT 31 and a fall in conversion accuracy and perform display of more faithful colors on the display unit 102.

When a program for calculating a 3×3 matrix coefficient shown in FIG. 5 is installed in information processing devices such as a personal computer, it is possible to calculate the 3×3 matrix coefficient in various information processing devices. It goes without saying that, as described above, the gamut converting device 1 itself may include an arithmetic unit that performs an arithmetic operation based on the program and have a function for calculating a 3×3 matrix coefficient.

The gamut converting device 1 only has to have a program for performing the processing in FIG. 3 by the negative-signal processing unit 2 and a program for performing the gamut conversion processing by the gamut converting unit 3. It is also possible to realize the gamut converting device 1 by installing these programs in, for example, a general-purpose computer device.

It is possible to record the program for calculating a 3×3 matrix coefficient and the program for realizing the gamut converting device 1 in an HD (Hard Disk) as a recording medium built in a personal computer or a device on a video editing system, a ROM in a microcomputer having a CPU, and the like in advance.

Alternatively, it is also possible to store (record) the programs in removable recording media such as a flexible disk, a CD-ROM (Compact Disk Read Only Memory), an MO (Magneto optical) disk, a DVD (Digital Versatile Disk), a magnetic disk, a semiconductor memory, and a memory card temporarily or permanently. It is possible to provide such removable recording media as so-called package software.

It is possible to install these programs in a personal computer or the like from the removable media. It is also possible to download the programs from a download site through networks such as a LAN (Local Area Network) and the Internet.

It should be understood by those skilled in the art that various modifications, combinations, sub-combinations, and alterations may occur depending on design requirements and other factors insofar as they are within the scope of the appended claims or the equivalents thereof.

What is claimed is:

1. A gamut converting device that applies gamut conversion to image data, the gamut converting device comprising:
   a memory unit for storing data;
   a signal converting unit that performs, when a negative value is included in an image signal value forming the image data, processing for converting the image signal value forming the image data to eliminate the negative value from the image signal value and outputs the image data without the processing for converting the image signal when a negative value is not included in the image signal; and
   a gamut converting unit that applies the gamut conversion to the image data, the image signal value of which is converted by the signal converting unit,
   wherein the gamut converting unit converts a RGB image signal of a DCI standard into a RGB image signal of ITU-R709 standard in order to display an image associated with the image data on a display device having the gamut of the ITU-R709 standard,
   wherein the signal converting unit determines a converting coefficient for converting the image signal value based on a representation of the image data in a device-independent calorimetric system, and
   wherein the signal converting unit determines a space in the device-independent calorimetric system, places a first point in the device-independent calorimetric system corresponding to an image signal having negative values, selects a second point in the space that is closest to a first point, and determines the converting coefficient using the first point and the second point, and
   wherein the signal converting unit receives an input RGB image signal and outputs a converted RGB signal to the gamut converting unit, and the RGB image signal converted by the signal converting unit assumes the same gamut as that of the RGB image signal before conversion, and
   wherein the signal converting unit determines the space based on image signals that have non-negative values, and a point outside the space represents an image signal that has a negative value, the non-negative values being divided by an interval ten times smaller than the negative values.

2. A gamut converting device according to claim 1, wherein the signal converting unit includes:
   a judging unit that judges whether a negative value is present as an image signal value forming the input image data; and
   a negative-value converting unit that performs processing for converting the image signal forming the image data, in which it is judged by the negative-value judging unit that the image signal value of the negative value is present, to eliminate the negative value from in the image signal values forming the input image data.

3. A gamut converting device according to claim 2, wherein the negative-value converting unit performs an arithmetic operation using a matrix coefficient set in advance and calculates a signal value not including a negative value.

4. A gamut converting device according to claim 1, wherein the image signal value forming the image data includes a first color signal value, a second color signal value, and a third color signal value.

5. A gamut converting device according to claim 1, wherein
   the image signal value forming the image data includes a first color signal value, a second color signal value, and a third color signal value, and
   the negative-value converting unit performs an arithmetic operation using a 3×3 matrix coefficient set in advance and calculates a signal value not including a negative value.

6. A gamut converting device according to claim 1, wherein the gamut-converting unit performs the gamut conversion using a lookup table.

7. A gamut converting device according to claim 1, wherein
   the image signal value forming the image data includes a first color signal value, a second color signal value, and a third color signal value, and
   the gamut converting unit performs the gamut conversion using a three-dimensional lookup table.

8. A gamut converting method of a gamut converting device for applying gamut conversion to image data, the method comprising the steps of:
   storing image data in a memory;
   performing, when a negative value is included in an image signal value forming the image data, processing for converting the image signal value forming the image data to eliminate the negative value from the image signal value and outputting the image data without the processing for converting the image signal when a negative value is not included in the image signal; and
   applying the gamut conversion to the image data, the image signal value of which is converted in the signal converting step,
   wherein the applying step converts a RGB image signal of a DCI standard into a RGB image signal of ITU-R709 standard in order to display an image associated with the image data on a display device having the gamut of the ITU-R709 standard,
   wherein the performing step determines a converting coefficient for converting the image signal value based on a representation of the image data in a device-independent calorimetric system, and
   wherein the performing step receives an input RGB image signal and outputs a converted RGB signal to the applying step, and the RGB image signal converted by the performing step assumes the same gamut as that of the RGB image signal before conversion, and
   wherein the performing step determines a space in the device-independent calorimetric system, places a first point in the device-independent calorimetric system corresponding to an image signal having negative values, selects a second point in the space that is closest to a first point, and determines the converting coefficient using the first point and the second point, and
   wherein the performing step determines the space based on image signals that have non-negative values, and a point outside the space represents an image signal that has a negative value, the non-negative values being divided by an interval ten times smaller than the negative values.

* * * * *